Figure 1:
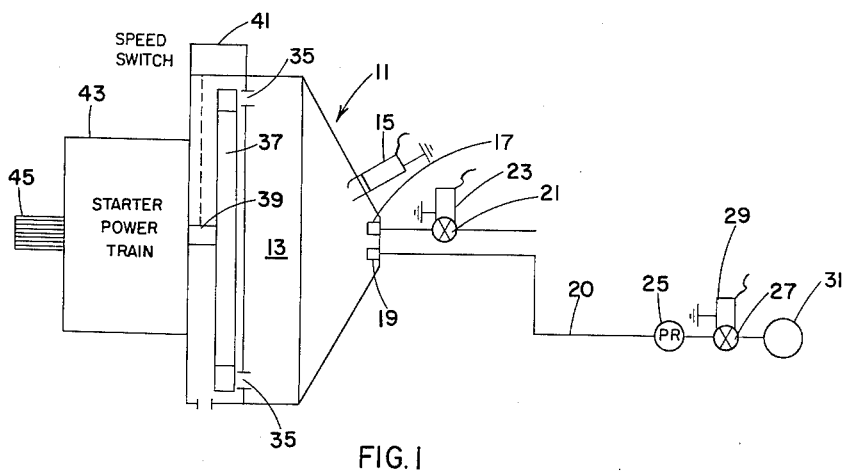

Dec. 4, 1962  J. H. FERGUSON, JR  3,066,487
COMBUSTION STARTER HAVING OVERSPEED SAFETY
Filed May 12, 1958

INVENTOR.
JOHN H. FERGUSON, JR.
BY
Robert W. Ely
ATTORNEY

United States Patent Office 3,066,487
Patented Dec. 4, 1962

3,066,487
COMBUSTION STARTER HAVING
OVERSPEED SAFETY
John H. Ferguson, Jr., Sauquoit, N.Y., assignor to The Bendix Corporation, a corporation of Delaware
Filed May 12, 1958, Ser. No. 734,684
3 Claims. (Cl. 60—39.14)

This invention relates to combustion starters for aircraft-type turbine engines and more particularly concerns such starters which have an overspeed switch arranged to cut-off the fuel and air supply.

In combustion starters, the direct current electrical circuit for energizing the air control solenoid valve, the fuel supply solenoid valve and the igniter includes a speed switch which cuts off the fuel and air and hence combustion gases for driving the starter turbine when the starter speed exceeds a predetermined safe starting speed. Unsafe speeds can rapidly result when there is break in the starter power train from the turbine to the associated aircraft engine. A power train break can be a slipping clutch or can result from a failure of the mechanism which causes engagement of the starter jaw with the engine jaw. The speed switch prevents the starter turbine, with the starter under no load, from speeding to destruction or "blow-up" which can seriously damage the adjacent structure and the aircraft.

It is apparent that, if the electricity supplied to the air value and fuel valve bypasses the speed switch, the aforenoted safety feature is lost. During a normal start, the electricity is supplied from a battery to the overspeed switch and then to the fuel valve and the air valve. However, since the air valve is located remote from the overspeed switch and further since an electrical circuit is provided for opening the air valve to give air-motoring of the starter, it is possible with improper wiring or short-circuiting for electricity to be fed back to open the fuel valve without passing through the overspeed switch as when the air valve is opened. Thus, with ignition, it is possible to generate combustion gases to energize the starter without the overspeed switch being in circuit. The starter can then, if there is a break in the power train, very rapidly speed to self-destruction.

An object of the present invention is to provide a combustion starter and control therefor in which by-passing of the overspeed switch is prevented.

Another object is the provision of such a starter which has an electrical check-valve in the electrical control circuit so arranged that electricity cannot flow from the air valve circuit to the igniter and fuel valve for combustion operation whereby the safety of the overspeed switch is retained.

A further object is the provision of such a starter having an air-motoring electrical circuit connected into the combustion-start circuit to the air valve in which an electrical check-valve prevents the flow of electricity from the air valve circuits, when short-circuited, to the remainder of the combustion-start circuit.

Figure 2:
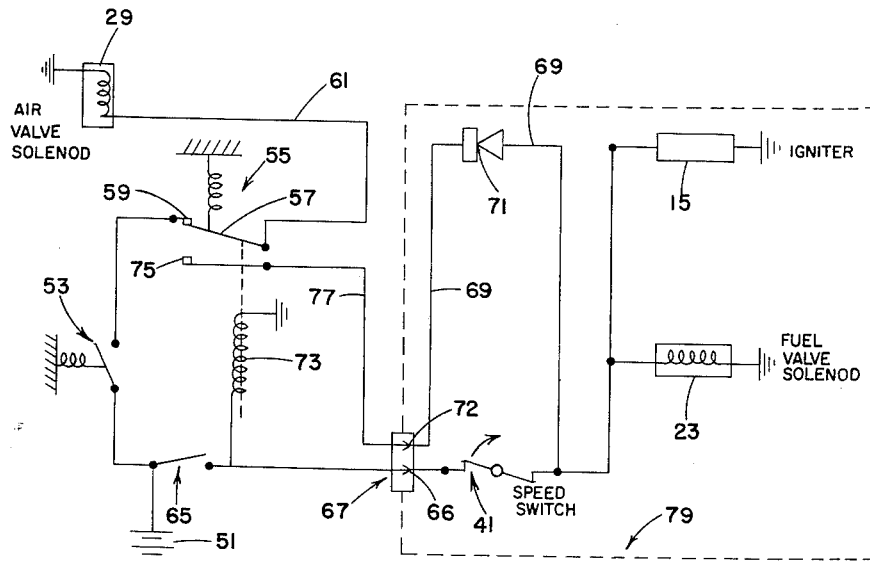

The accomplishment of the above objects, along with the features and advantages of the invention, will be apparent from the following detailed description and the accompanying drawing in which:

FIG. 1 is schematic representation of a combustion starter and shows the basic components for providing combustion gases and FIG. 2 is an electric schematic of the control circuits and shows the relation of the speed switch to the valve solenoids and the igniter of FIG. 1.

Referring to FIG. 1, the combustion starter 11 includes a combustion chamber 13 which has an igniter 15, a fuel nozzle 17, and an air nozzle 19. The fuel is supplied to nozzle 17 by a conduit which includes normally-closed fuel valve 21 having a solenoid 23 for the opening thereof. The air for air nozzle 19 is supplied by means of a conduit 20 which has a pressure regulator 25 and a normally-closed air valve 27 having a solenoid 29 for the opening of valve 27. A suitable source of pressurized air such as an air bottle 31 is provided for supplying air to the valve 27. The air bottle 31, regulator 25 and valve 27 are positioned some distance from the starter 11 as indicated by the length of air conduit 20.

By a control which will be described below, the air and fuel are supplied to and ignited in combustion chamber 13 and provide high pressure combustion gases which pass through nozzles 35 for driving the starter turbine 37. The turbine shaft 39 is connected by suitable gearing which is indicated by a dashed line to a flyweight type speed-responsive switch 41. Overspeed switch 41 serves to cut off the supply of fuel and air to the combustion chamber 13 and hence the combustion gases to the turbine 37 when starting speed is reached. The turbine shaft 39 is connected to a starter power train 43 which conventionally includes reduction gearing, a clutch pack, and coupling means for connecting the output of a spline 45. Spline 45 is adapted to be connected to an associated aircraft turbine engine. The starter power train 43 can be as disclosed in U.S. Patent No. 2,553,201. Switch 41 will also prevent the starter from exceeding the predetermined speed at which starting occurs in the event the starter power train is defective and hence the starter rapidly speeds up under no load.

Referring to FIG. 2, which illustrates the electrical control for the starter of FIG. 1, the positive terminal of the battery 51 is connected to an air motoring switch 53 which is normally spring-biased to an open position and can be closed only when the pilot presses the switch. The air motoring switch 53 is connected to a relay 55 which includes a contact arm 57. The contact arm 57 is normally spring-biased so as to provide an electrical flow path between contact 59 and conductor 61 which leads to the solenoid 29 of the air control valve. With this arrangement, the pilot is able to air-motor the starter 11 at low safe speeds with relatively low pressure gas in order to determine whether or not the turbine 37 is transmitting torque to the associated engine. This is possible since the pilot can observe the engine speed by means of a tachometer.

After making such a check of the operative condition of the starter, the pilot will release switch 53 and close starting switch 65 which is also connected to the positive terminal of battery 51. The closing of starting switch 65 permits current to flow through conductors to terminal 66 of connector plug 67 and then to speed switch 41. From the normally-closed centrifugally-actuated switch 41, electrical current is supplied to the fuel valve solenoid 23 and to igniter 15. Igniter 15 can be energized by a connection to the wire between the terminal 66 and the speed switch 41. Current is also supplied through connector 69 having an electrical check valve or rectifier 71 to terminal 72 of the separable connector 67. The electrical check valve 71 is a silicon diode or selenium plate rectifier which is so constructed and arranged that current can only flow from overspeed switch 41 to terminal 72 of connecter plug 67 and then to air valve solenoid 29 by an extended circuit which will now be described.

Upon the closing of starting switch 65, current is also supplied to the coil 73 of the relay 55 so that contact arm 57 is pulled away from contact 59 and against the spring bias into contact with contact 75. Thus, current can flow from rectifier 71 through connector plug 67 and conductor 77 to conductor 61 which leads to the air valve solenoid 29. The electrical check valve 71 will prevent the flow of current from terminal 72 to the fuel solenoid 23 and the igniter 15.

Since the air supply 31, battery 51, and switch 65 are located some distance from the starter 11, it is not possible to include them with the units and the electrical circuit which are adjacent the starter and form a starter and control assembly. This assembly is indicated by a dashed-line box 79 in FIG. 2 and connector 67 provides for connecting assembly 79 to the air valve solenoid 29 and battery 51. Since rectifier 71 is part of assembly 79, it is less likely to be made ineffective during installation or overhaul.

The operation of the starter during the normal starting cycle is believed to be apparent from the foregoing. Thus, when starting switch 65 is closed, it is apparent that the fuel valve 21 and air valve 27 will be suitably controlled by the overspeed switch 41 and that the starter will be de-energized by opening switch 65 after starting. The functioning of electrical check valve or rectifier 71 and the safety feature of the present invention can be appreciated if it is assumed that the relay 55 malfunctions so that current can be supplied to conductor 77, as when air motoring switch 53 is closed. It is also possible for there to be an improper connection of conductor 77 to the connection post of the arm 57 of the relay 55. When one of these conditions exist and the air motoring switch 53 is closed, it is apparent that current can flow through conductor 77 to the igniter 15 and the fuel valve solenoid 23, if rectifier 71 was omitted. Likewise if another source of electricity is shorted to conductors 61 and 77 (due to bare wires) from another wire adjacent conductors 61 and 77, electric current can flow to air valve solenoid 29, igniter 15, and fuel solenoid 23. Operation of the fuel valve and the air valve and a combustion start would then occur without the overspeed switch 41 providing the safety which has been described above. Since the overspeed switch would not be in circuit and assuming a condition which does not put a load on the starter, such as a slipping clutch, it is apparent that the starter can rapidly speed up to run-away speed which results in destruction of the starter turbine wheel 37. However, with the electrical check valve 71 in conductor 69, it is clear that current from conductor 77 and terminal 72 cannot flow to the igniter 15 or the fuel valve solenoid 23. Thus, means have been provided for preventing the bypass of the overspeed switch 41 due to improper wiring or malfunctioning in the circuits leading to the air valve solenoid 29. A combustion start can be accomplished only with the overspeed switch 41 in circuit and controlling the opening of the air and fuel valves.

It is to be understood that persons skilled in the art can make changes in the described embodiment of the invention without departing from the invention as set forth in the appended claims.

What is claimed is:

1. A combustion starter and control therefor comprised of a combustion chamber arranged to supply gases to a turbine, said turbine having a power train connected thereto for driving a turbine engine to starting speed, said chamber having an igniter, fuel supply means including a normally-closed fuel valve having a solenoid for the opening thereof arranged to supply fuel to said chamber, air supply means including a normally-closed air valve having a solenoid for the opening thereof arranged to supply air to said chamber, a speed switch arranged to be opened when said turbine exceeds a predetermined speed, an electric connector having a first and second electric terminals, a battery connected to said first terminal, first electrical conductor means extending from said first terminal and electrically connecting said speed switch to said second electric terminal and said fuel valve solenoid, said igniter being connected to said first conductor means, second electrical conductor means extending from said second terminal to said air valve solenoid, air motoring means arranged to pass electricity from said battery to said air valve solenoid for air operation of said turbine, said first conductor means including an electrical check-valve constructed and arranged to prevent electric current from passing from said second terminal to said fuel valve solenoid and said igniter, whereby said speed switch cannot be bypassed by electricity from said air motoring means or from said second electrical conductor means.

2. A combustion starter and control therefor comprised of a combustion chamber arranged to supply gases to a turbine, said turbine having a power train connected thereto for driving a turbine engine to starting speed, air supply means including a normally-closed air valve having a solenoid for the opening thereof arranged to supply air to said chamber, fuel supply means including a normally-closed fuel valve having a solenoid for the opening thereof arranged to supply fuel to said chamber, said chamber having an igniter, a normally-closed speed switch arranged to be opened when said turbine exceeds a predetermined speed, first electric conductor means including separable connector providing an electric flow path from the separable connector to said air valve solenoid, second electric conductor means electrically connecting said speed switch to said fuel valve solenoid and to said separable connector, said second conductor means including an electrical check-valve constructed and arranged to prevent electric current from passing from said separable connector to said fuel valve solenoid, a battery electrically connected to said speed switch by means including a starting switch, third conductor means including an air motoring switch arranged to connect said battery to said air valve solenoid, a relay common to said first conductor means and said third conductor means and being arranged normally to provide a connection to said air motor switch, said relay being further arranged to provide a connection to said air valve solenoid by said first conductor means when said starting switch is closed and to break the connection of said third conductor means.

3. A combustion starter and control therefor comprised of a turbine and a combustion chamber arranged to supply gases to the turbine, said fuel supply means including a normally-closed fuel valve having a solenoid for the opening thereof arranged to supply fuel to said chamber, air supply means including a normally-closed air valve having a solenoid for the opening thereof arranged to supply air to said chamber, a speed switch arranged to be opened when said turbine exceeds a predetermined speed, an electric connector having a first and second electric terminals, a battery connected to said first terminal by means including a combustion-start switch, first electrical conductor means extending from said first terminal and electrically connecting said speed switch to said second electric terminal and said fuel valve solenoid, second electrical conductor means extending from said second terminal to said air valve solenoid, air motoring means arranged to energize through said second means said air valve solenoid for air operation of said turbine, said first conductor means including an electrical check-valve constructed and arranged to prevent electric current from passing from said second terminal to said fuel valve solenoid, whereby said speed switch cannot be bypassed by electricity from said second electrical conductor means.

References Cited in the file of this patent

UNITED STATES PATENTS

| | | |
|---|---|---|
| 1,832,292 | Fowler | Nov. 17, 1931 |
| 2,643,511 | Briggs | June 30, 1953 |
| 2,697,482 | Blizard | Dec. 21, 1954 |
| 2,742,757 | Jaquith | Apr. 24, 1956 |
| 2,742,759 | Flanigen et al. | Apr. 24, 1956 |
| 2,847,662 | Lindgren | Aug. 12, 1958 |
| 2,863,283 | Schmider | Dec. 9, 1958 |

OTHER REFERENCES

"De Biasi," Aviation Age, June 1957, pages 106–107.